United States Patent
Grossman et al.

(10) Patent No.: US 9,600,090 B2
(45) Date of Patent: Mar. 21, 2017

(54) MULTI-TOUCH INTEGRATED DESKTOP ENVIRONMENT

(75) Inventors: Tovi Grossman, Toronto (CA); Justin Frank Matejka, Etobicoke (CA); George Fitzmaurice, Toronto (CA); Xiaojun Bi, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1268 days.

(21) Appl. No.: 12/985,308

(22) Filed: Jan. 5, 2011

(65) Prior Publication Data
US 2012/0169598 A1 Jul. 5, 2012

(51) Int. Cl.
*G06F 3/033* (2013.01)

(52) U.S. Cl.
CPC .................... *G06F 3/033* (2013.01)

(58) Field of Classification Search
CPC .... G06F 3/033; G06F 3/03547; G06F 3/0395; G06F 3/0416
USPC ................................ 345/156–179
See application file for complete search history.

(56) References Cited

U.S. PATENT DOCUMENTS

| | | |
|---|---|---|
| 5,815,154 A | 9/1998 | Hirschtick et al. |
| 6,246,407 B1 | 6/2001 | Wilks et al. |
| 6,252,595 B1 | 6/2001 | Birmingham et al. |
| 7,956,845 B2 | 6/2011 | Lee |
| 8,125,457 B2 | 2/2012 | Lawson et al. |
| 8,405,677 B2 | 3/2013 | Ranford |
| 8,619,038 B2 | 12/2013 | Chaudhri et al. |
| 2002/0000145 A1* | 1/2002 | Gottschalk ............... B26D 1/08 83/76.9 |
| 2003/0160824 A1 | 8/2003 | Szumla |
| 2003/0174125 A1 | 9/2003 | Torunoglu et al. |
| 2003/0184516 A1 | 10/2003 | Sakurai |
| 2004/0021681 A1 | 2/2004 | Liao |
| 2004/0027312 A1 | 2/2004 | Owada et al. |
| 2005/0024341 A1* | 2/2005 | Gillespie ............... G06F 1/1616 345/173 |
| 2005/0149877 A1 | 7/2005 | Rice et al. |
| 2006/0001645 A1 | 1/2006 | Drucker et al. |
| 2006/0034042 A1* | 2/2006 | Hisano .................. G06F 1/1616 361/679.04 |
| 2006/0101349 A1* | 5/2006 | Lieberman ............. G06F 3/011 715/773 |
| 2006/0225003 A1 | 10/2006 | Agogino et al. |
| 2006/0244734 A1 | 11/2006 | Hill et al. |

(Continued)

OTHER PUBLICATIONS

International Search Report, PCT/US2012/020322 dated May 7, 2012.

(Continued)

*Primary Examiner* — Kumar Patel
*Assistant Examiner* — Vinh Lam
(74) *Attorney, Agent, or Firm* — Artegis Law Group, LLP

(57) ABSTRACT

A technique for integrating a multi-touch surface into a desktop environment is disclosed. One or more multi-touch display devices are placed on the horizontal surface surrounding or beneath a keyboard or mouse. At least one region on the multi-touch surface is defined to display one or more user interface tools on the multi-touch surface. The one or more user interface tools displayed via the multi-touch surface may control or display information associated with desktop applications displayed via a primary display device.

20 Claims, 14 Drawing Sheets

(56) References Cited

U.S. PATENT DOCUMENTS

| | | | |
|---|---|---|---|
| 2007/0073137 A1* | 3/2007 | Schoenefeld | A61B 90/36 600/407 |
| 2007/0120870 A1 | 5/2007 | Ford et al. | |
| 2008/0150899 A1* | 6/2008 | Lin | G06F 3/014 345/168 |
| 2008/0174553 A1* | 7/2008 | Trust | G06F 3/0202 345/163 |
| 2008/0214233 A1 | 9/2008 | Wilson et al. | |
| 2008/0266255 A1 | 10/2008 | Lawson et al. | |
| 2008/0307360 A1 | 12/2008 | Chaudhri et al. | |
| 2009/0027330 A1* | 1/2009 | Aida | G06F 3/04883 345/156 |
| 2009/0066728 A1 | 3/2009 | Ording | |
| 2009/0231281 A1 | 9/2009 | Whytock et al. | |
| 2009/0303231 A1 | 12/2009 | Robinet et al. | |
| 2010/0066677 A1* | 3/2010 | Garrett | G06F 1/1626 345/163 |
| 2010/0079369 A1 | 4/2010 | Hartmann et al. | |
| 2010/0079404 A1 | 4/2010 | Degner et al. | |
| 2010/0179390 A1 | 7/2010 | Davis | |
| 2010/0207888 A1 | 8/2010 | Camiel | |
| 2010/0214218 A1* | 8/2010 | Vaisanen | G06F 3/0488 345/163 |
| 2010/0214250 A1* | 8/2010 | Gillespie | G06F 3/0488 345/173 |
| 2010/0231612 A1 | 9/2010 | Chaudhri et al. | |
| 2010/0250816 A1 | 9/2010 | Collopy et al. | |
| 2010/0275033 A1* | 10/2010 | Gillespie | G06F 3/0481 713/182 |
| 2010/0275163 A1* | 10/2010 | Gillespie | G06F 3/0481 715/810 |
| 2010/0295794 A1 | 11/2010 | Russ et al. | |
| 2010/0302144 A1* | 12/2010 | Burtner | G06F 3/0416 345/157 |
| 2010/0302155 A1* | 12/2010 | Sands | G06F 3/042 345/163 |
| 2010/0302168 A1 | 12/2010 | Giancarlo et al. | |
| 2010/0313165 A1 | 12/2010 | Louch et al. | |
| 2010/0315377 A1* | 12/2010 | Chang | G06F 3/0386 345/175 |
| 2010/0328251 A1 | 12/2010 | Sinclair | |
| 2011/0016434 A1 | 1/2011 | Charles et al. | |
| 2011/0047459 A1 | 2/2011 | Van Der Westhuizen | |
| 2011/0057956 A1 | 3/2011 | Ranford | |
| 2011/0063222 A1 | 3/2011 | Chu et al. | |
| 2011/0241999 A1 | 10/2011 | Thier | |
| 2011/0248947 A1 | 10/2011 | Krahenbuhl et al. | |
| 2011/0270824 A1 | 11/2011 | Morris et al. | |
| 2011/0304531 A1 | 12/2011 | Brooks | |
| 2012/0062470 A1 | 3/2012 | Chang | |
| 2012/0092346 A1 | 4/2012 | Ording et al. | |
| 2012/0102400 A1 | 4/2012 | Worley et al. | |
| 2012/0102437 A1 | 4/2012 | Worley et al. | |
| 2012/0212420 A1 | 8/2012 | Shin | |
| 2012/0235949 A1 | 9/2012 | Ligtenberg | |
| 2012/0236035 A1 | 9/2012 | Kimura | |
| 2012/0262488 A1 | 10/2012 | Liu et al. | |
| 2012/0297341 A1 | 11/2012 | Glazer et al. | |
| 2013/0125068 A1 | 5/2013 | Harris et al. | |
| 2013/0335333 A1 | 12/2013 | Kukulski et al. | |

OTHER PUBLICATIONS

Apple Magic Mouse. http://www.apple.com/, Mar. 29, 2012.
Block et al., "Touch-Display Keyboards: Transforming Keyboards into Interactive Surfaces", Apr. 10-15, 2010, CHI 2010: Tangible UI. p. 1145-1154.
Dell Latitude XT2 Tablet PC Touch Screen http://www.dell.com/tablet?s=biz&cs=555, Mar. 29, 2012.
Dell SX2210T Multi-Touch Monitor http://support.dell.com/support/edocs/monitors/sx2210t/, Mar. 29, 2012.
Dietz, P. and Leigh, D. (2001) "DiamondTouch: A Multi-User Touch Technology." ACM UIST. p. 219-226.
Forlines, et al. (2007), "Direct-touch vs. Mouse Input for Tabletop Displays." ACM CHI. p. 647-656.
Han, J. Y. (2005). "Low-Cost Multi-Touch Sensing Through Frustrated Total Internal Reflection." ACM UIST. p. 115-118.
Hartmann, et al. (2009). "Augmenting Interactive Tables with Mice & Keyboards." ACM UIST. p. 149-152.
Hedge, A., "Anthropometry and Workspace Design, in DEA 325/651. 2002", Cornell.
Hinrichs, et al., (2007) "Examination of Text-Entry Methods for Tabletop Displays", Tabletop. 8 pages.
Kane, et al. (2009). "Bonfire: A Nomadic System for Hybrid Laptop-Tabletop Interaction", ACM UIST. p. 129-138.
Kin, et al. (2009), "Determining the Benefits of Direct-Touch, Bimanual, and Multifinger Input on a Multitouch Workstation", GI. 6 pages.
Malik, et al. (2005), "Interacting with Large Displays From a Distance with Vision-Tracked Multi-Finger Gestural Input", ACM UIST. 1 page.
Matthews, et al. (2006). "Clipping Lists and Change Borders: Improving Multitasking Efficiency with Peripheral Information Design", ACM CHI. p. 989-998.
Morris, et al. (2008) "A Field Study of Knowledge Workers' Use of Interactive Horizontal Displays". TableTop. 8 pages.
Moscovich, et al. (2008). "Indirect Mappings of Multi-Touch Input Using One and Two Hands", ACMCHI. p. 275-1284.
Multi-Touch in Window 7. microsoft.com|windows, Mar. 29, 2012.
Pinhanez, et al. (2003), "Creating Touch-Screens Anywhere with Interactive Projected Displays". ACM Multimedia. p. 460-461.
Rekimoto, J. (2002), "SmartSkin: An Infrastructure for Freehand Manipulation on Interactive Surfaces", ACM CHI. 113-120.
Rekimoto, et al. (1999) "Augmented Surfaces: A Spatially Continuous Work Space for Hybrid Computing Environments", ACM CHI. 378-385.
Rosenberg, et al. (2009), "The UnMousePad: An Interpolating Multi-Touch Force-Sensing Input Pad." SIGGRAPH. 10 pages. ACM Transactions of Graphics, vol. 28, No. 3. Article 65.
Scott, S.D. (2003) "Territory-Based Interaction Techniques for Tabletop Collaboration", ACM UIST. 4 pages.
Ullmer, et al. (1997) "The metaDESK: Models and Prototypes for Tangible User Interfaces". ACM UIST, p. 223-232.
Villar, et al., (2009). "Mouse 2.0: Multi-Touch Meets the Mouse", ACM UIST. p. 33-42.
Vogel, et al. (2010), "Occlusion Aware Interfaces", to appear in CHI 2010: Interfaces and Visualization. p. 263-272.
Wellner, P. (1993) "Interacting with Paper on the DigitalDesk", Communications of the ACM, 36 (7), p. 87-96.
Wigdor, et al. (2007). "Living with a Tabletop: Analysis and Observations of Long Term Office Use of a Multi-Touch Table", TableTop, p. 60-67.
Wigdor, et al. (2006). "Table-Centric Interactive Spaces for Real-Time Collaboration", AVI, 5 pgs.
Wilson, A. D. (2005) "Play Anywhere: A Compact Interactive Tabletop Projection-Vision System", ACM UIST. p. 83-92.
Wilson, et al. (2008) "Bringing Physics to the Surface", ACM UIST. p. 67-76.
Wu, et al. (2003) "Multi-Finger and Whole Hand Gestural Interaction Techniques for Multi-User Tabletop displays", ACM UIST. vol. 5, Issue 2. p. 193-202.
Yang, et al. (2010). "LensMouse: Augmenting the Mouse with an Interactive Touch Display", to appear in CHI2010: Display where you Least Expect Them. p. 2431-2440.
Non-Final Office Action dated Nov. 18, 2015, U.S. Appl. No. 12/985,304.
Non-final Office Action dated Mar. 6, 2014, U.S. Appl. No. 12/985,307.
Final Office Action dated Oct. 11, 2013, U.S. Appl. No. 12/985,304.
Non-Final Office Action dated May 16, 2013, U.S. Appl. No. 12/985,305.
Final Office Action dated Oct. 9, 2013, U.S. Appl. No. 12/985,305.
Non-Final Office Action dated Jun. 5, 2014, U.S. Appl. No. 12/985,305.
Final Office Action dated Nov. 12, 2014, U.S. Appl. No. 12/985,305.

(56) References Cited

OTHER PUBLICATIONS

Non-Final Office Action dated May 14, 2013, U.S. Appl. No. 12/985,308.
Final Office Action dated Oct. 30, 2013, U.S. Appl. No. 12/985,308.
Non-Final Office Action dated Apr. 23, 2013, U.S Appl. No. 12/985,307.
Final Office Action dated Aug. 29, 2014, U.S. Appl. No. 12/985,307.
Final Office Action dated Sep. 24, 2013, U.S. Appl. No. 12/985,307.
MAC OS X, © 2001 Apple Computer, Inc., 32 pages.
Final Office Action dated May 21, 2015, U.S. Appl. No. 12/985,304, 18 pages.
Office Action dated May 4, 2015, U.S. Appl. No. 12/985,305, 19 pages.
Office Action dated Nov. 5, 2014 for U.S. Appl. No. 12/985,304.

* cited by examiner

MULTI-TOUCH INTEGRATED DESKTOP ENVIRONMENT

BACKGROUND OF THE INVENTION

Field of the Invention

The invention relates generally to input/output devices and, more specifically, to a multi-touch integrated desktop environment.

Description of the Related Art

Multi-touch displays are becoming increasingly common in consumer devices. For example, over the past decade, desktop monitors and hand-held devices have incorporated multi-touch surfaces with which users can interact to provide input information to the underlying devices. One interesting aspect of a multi-touch surface is the ability to control multiple degrees-of-freedom. For example, conventional rectangle manipulations include translation, rotation, and scaling operations performed on a multi-touch surface by dragging, rotating, or expanding/contracting, respectively, one or more contact points. Thus, a user may interact with an application via a multi-touch surface by tapping, dragging, expanding, contracting, or rotating one or more contact points on the multi-touch surface. These operations are typically more efficient to perform on a multi-touch surface than with traditional input/output devices.

Typically, when a multi-touch surface is used within a desktop environment, the multi-touch surface replaces the input/output devices one would typically use with a desktop machine. For example, a traditional keyboard is replaced with an on-screen keyboard projected on the multi-touch surface, a traditional mouse is replaced with a multi-touch surface on the primary display or by a touchpad, and a stylus is added for inputting text on the multi-touch surface via software that recognizes handwriting.

One drawback to this conventional design approach is that multi-touch surfaces suffer from sensing resolution problems that can limit the precision of touch input. Consequently, actions such as typing on a projected keyboard or selecting fine features in a drawing application may be difficult using a multi-touch surface. Another drawback is that an on-screen keyboard lacks tactile feedback to the user and, therefore, users may not be as comfortable typing using the on-screen keyboard without the feeling of depressing each individual keystroke.

As the foregoing illustrates, what is needed in the art is a system that more optimally integrates the benefits of a multi-touch surface into a traditional desktop environment.

SUMMARY OF THE INVENTION

One embodiment of the invention sets forth a method for integrating a multi-touch surface into a desktop environment. The method generally includes detecting a location of at least one input device on the multi-touch surface and defining at least one region on the multi-touch surface in proximity to the location of the at least one input device. The method further includes monitoring the multi-touch surface for any changes in the location of the at least one input device and, in response to a change in the location of the at least one input device, changing the location of the at least one region to substantially match the change in the location of the at least one input device.

Another embodiment of the invention sets forth a method for configuring a multi-touch surface to display an enhanced task bar. The method generally includes defining a region on the multi-touch surface proximate to one or more input devices detected on the multi-touch surface for displaying the enhanced task bar and generating one or more user interface elements that are disposed within the enhanced task bar, where each user interface element is configured to control a different application window displayed via a display device. The method further includes displaying the enhanced task bar in the region on the multi-touch surface, detecting multi-touch input associated with a first user interface element disposed within the enhanced task bar, and adjusting a first application window displayed via the display device based on the multi-touch input.

Yet another embodiment of the invention sets forth a method for configuring a multi-touch surface to display a multi-functional touch pad. The method generally includes defining a region on the multi-touch surface proximate to one or more input devices detected on the multi-touch surface for displaying the multi-functional touch pad and generating one or more user interface elements that are disposed within the multi-functional touch pad, where each user interface element is configured to control a different operation within an application window displayed via a display device. The method further includes displaying the multi-functional touch pad in the region on the multi-touch surface, detecting multi-touch input associated with a first user interface element disposed within the multi-functional touch pad, and performing a first operation within the application window based on the multi-touch input.

Yet another embodiment of the invention sets forth a method for configuring a multi-touch surface to display a digital mouse pad. The method generally includes defining a region on the multi-touch surface proximate to a mouse device detected on the multi-touch surface for displaying the digital mouse pad and generating one or more user interface elements that are disposed within the digital mouse pad, where each user interface element is configured to control a different operation within an application window displayed via a display device. The method further includes displaying the digital mouse pad in the region on the multi-touch surface, detecting multi-touch input associated with a first user interface element disposed within the digital mouse pad, and performing a first operation within the application window based on the multi-touch input.

One advantage of the disclosed techniques is that multi-touch surfaces are integrated with the desktop environment without removing the traditional keyboard and mouse used for precision input. A user may still type using a keyboard or use a mouse for precision selection. In addition, the user may utilize multi-touch regions in proximity to the keyboard and mouse to perform operations better suited to multi-touch input. In this manner, the bandwidth of interaction between the user and the computer interface is increased.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
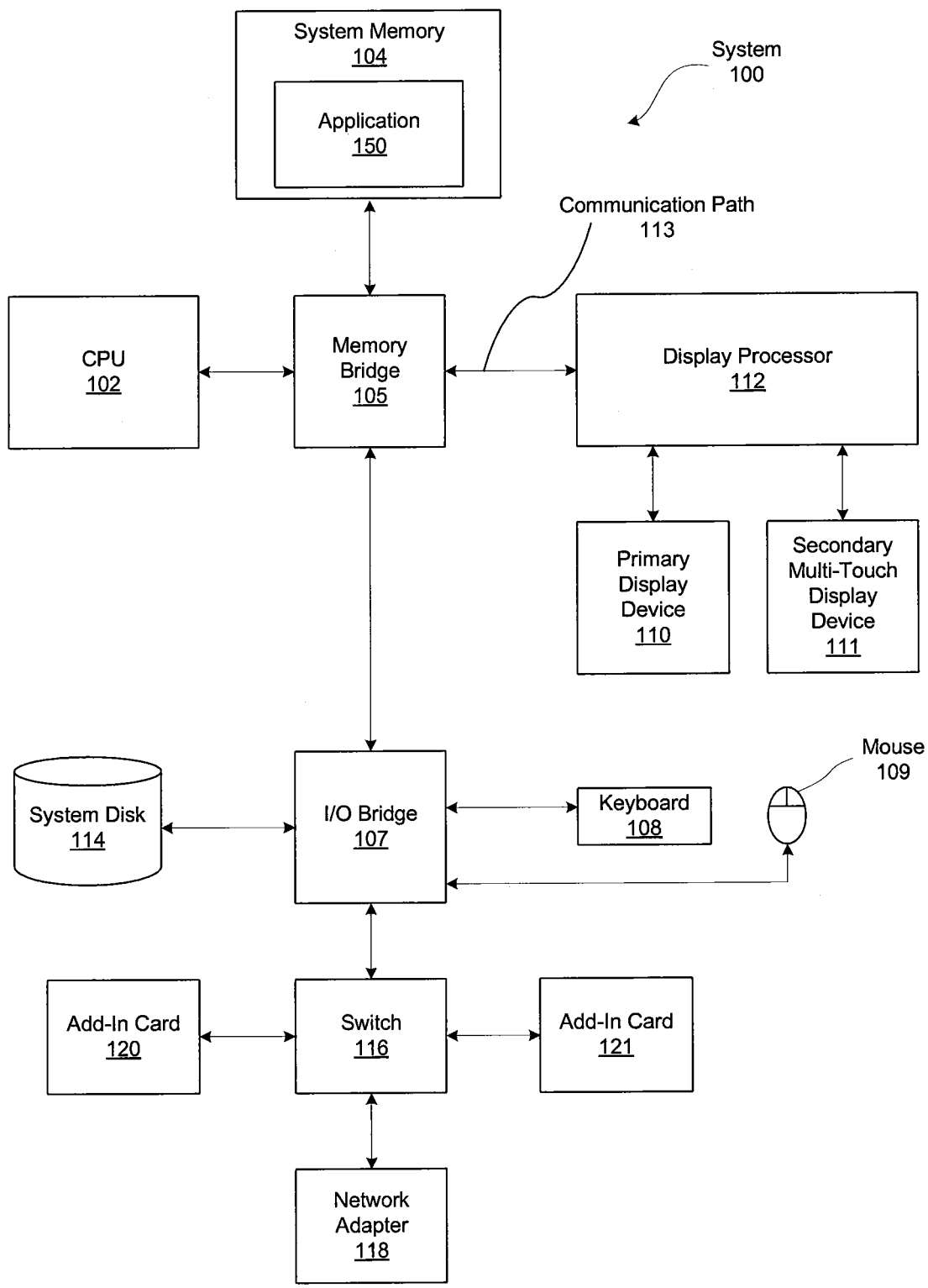
FIG. 1 is a block diagram of a system configured to implement one or more aspects of the present invention.

FIG. 1 is a block diagram of a system 100 configured to implement one or more aspects of the present invention. System 100 may be a computer workstation, personal computer, video game console, or any other device suitable for practicing one or more embodiments of the present invention.

As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a primary display device 110. In one embodiment, primary display device 110 may be any conventional CRT or LED monitor. Display processor 112 can provide primary display device 110 with an analog or digital signal. In alternative embodiments, primary display device 110 may comprise a multi-touch display device such as any conventional CRT or LED monitor with an integrated sensor that detects the presence and location of a user touching the display area of the monitor. In such alternative embodiments, primary display device 110 may provide gesture recognition input to display processor 112 or CPU 102.

Display processor 112 also periodically delivers pixels to and receives gesture recognition input from a secondary multi-touch display device 111. Secondary multi-touch display device 111 may be a desktop surface implemented with a multi-touch surface, such as Microsoft Surface™. In operation, the secondary multi-touch display device 111 defines the touch-sensitive portions of the desktop surface and enables display processor 112 to display graphical content and provide gesture recognition capabilities to system 100. In one embodiment, secondary multi-touch display device 111 corresponds to the entire desktop surface available to the end-user. In other embodiments, secondary multi-touch display device 111 may constitute only a portion of the desktop surface.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface on both primary display device 110 and secondary multi-touch display device 111. Application 150 may be configured to move graphics objects between the primary display device 110 and the secondary multi-touch display device 111.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Figure 2A:
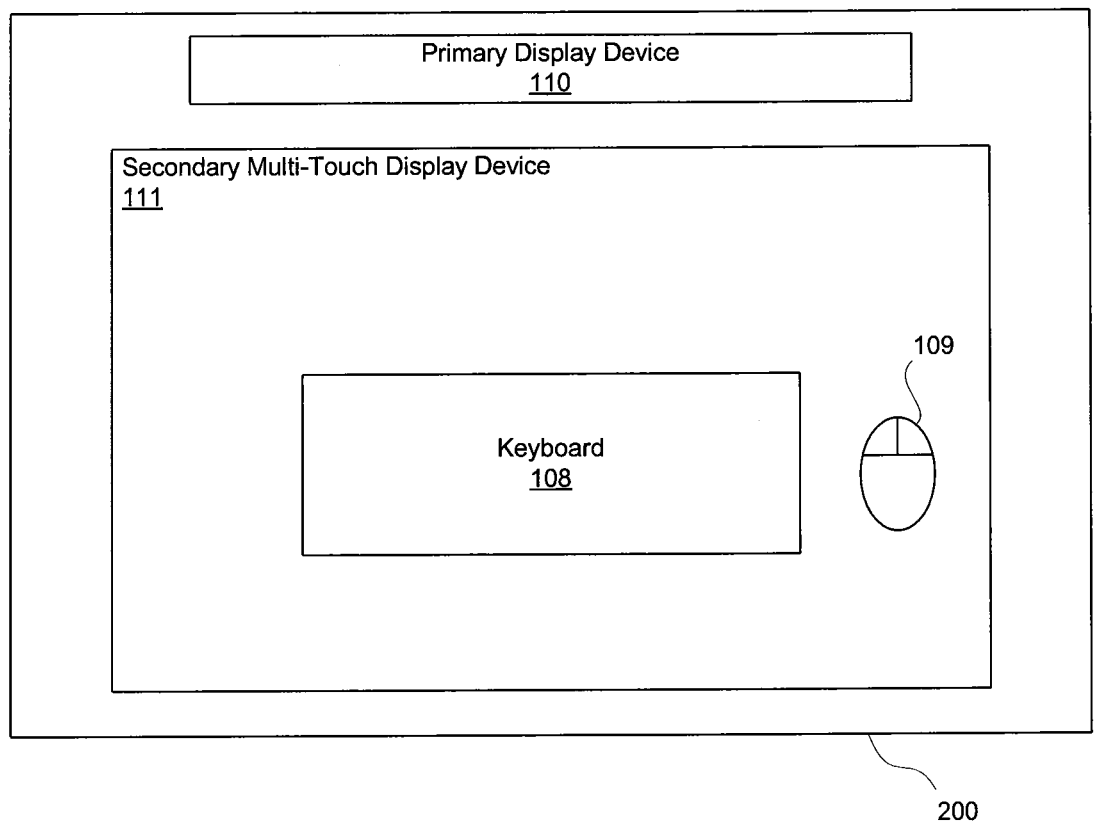
FIGS. 2A and 2B are a top-view and front-view, respectively, of a multi-touch desktop environment, according to one embodiment of the present invention.
Figure 2B:
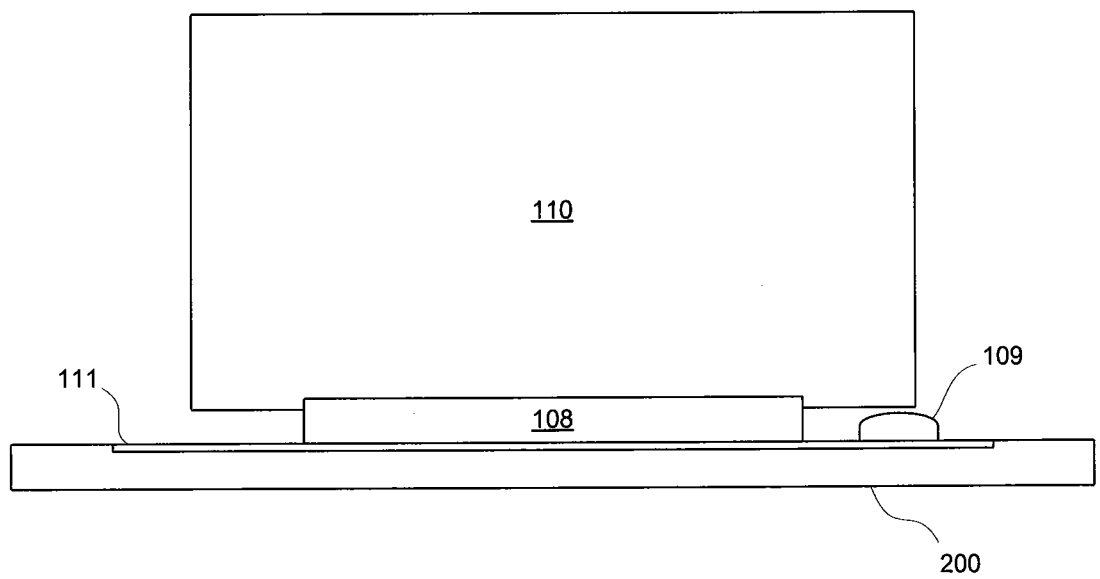

FIGS. 2A and 2B are a top-view and front-view, respectively, of a multi-touch desktop environment 200, according to one embodiment of the present invention. As shown, the multi-touch desktop environment 200 includes, without limitation, a primary display device 110, a secondary multi-touch display device 111, a keyboard 108, and a mouse 109. In one embodiment, the primary display device 110 is positioned vertically on a desktop surface facing the end-user. The secondary multi-touch display device 111 is positioned horizontally on a desktop surface between the primary display device 110 and the end-user. The keyboard 108 and mouse 109 may be positioned on top of the secondary multi-touch display device 110.

In one embodiment, the front surface of primary display device 110 implements a touch sensitive surface that includes multi-touch gesture recognition capabilities. An end-user may use one or more fingers to perform various gestures that initiate operations such as rotate, scale, and zoom. In addition, the desktop surface includes secondary multi-touch display 111 that also implements a touch-sensitive surface that includes multi-touch gesture recognition capabilities. Both the primary display device 110 and the secondary multi-touch display device 111 include the capability to display graphics and video on the multi-touch surface.

In alternative embodiments, primary display device 110 may be a conventional display device without multi-touch input surfaces. In such embodiments, multi-touch desktop environment 200 only recognizes multi-touch input on secondary multi-touch display device 111, and any input associated with primary display device 110 is performed using conventional input devices such as keyboard 108 or mouse 109.

In one embodiment, multi-touch desktop environment 200 is configured to track the position of keyboard 108 and mouse 109 on the secondary multi-touch display device 111. While tracking the position of the keyboard 108 and mouse 109, multi-touch desktop environment 200 may display various tools on secondary multi-touch display device 111 that enhance end-user interactivity such as by providing a secondary cursor or enabling a user to select various operations in application 150 without using conventional input devices such as the keyboard 108 or mouse 109. In one embodiment, multi-touch desktop environment 200 is configured to display tools in regions of the multi-touch surface to the left, right, bottom, and top of keyboard 108. In alternative embodiments, multi-touch desktop environment 200 may be configured to utilize less than the entire desktop surface such as by only implementing a multi-touch surface to one side of keyboard 108. The secondary multi-touch display device 111 may have a static configuration (i.e., the locations of various tools displayed on secondary multi-touch display device 111 are pre-defined and fixed) or a dynamic configuration that changes based on the tracked positions of the one or more input devices detected on secondary multi-touch display device 111. As described in further detail in conjunction with FIGS. 3A-3E below, multi-touch desktop environment 200 may be configured to change configurations based on the position of the keyboard 108 and mouse 109.

Figure 2C:
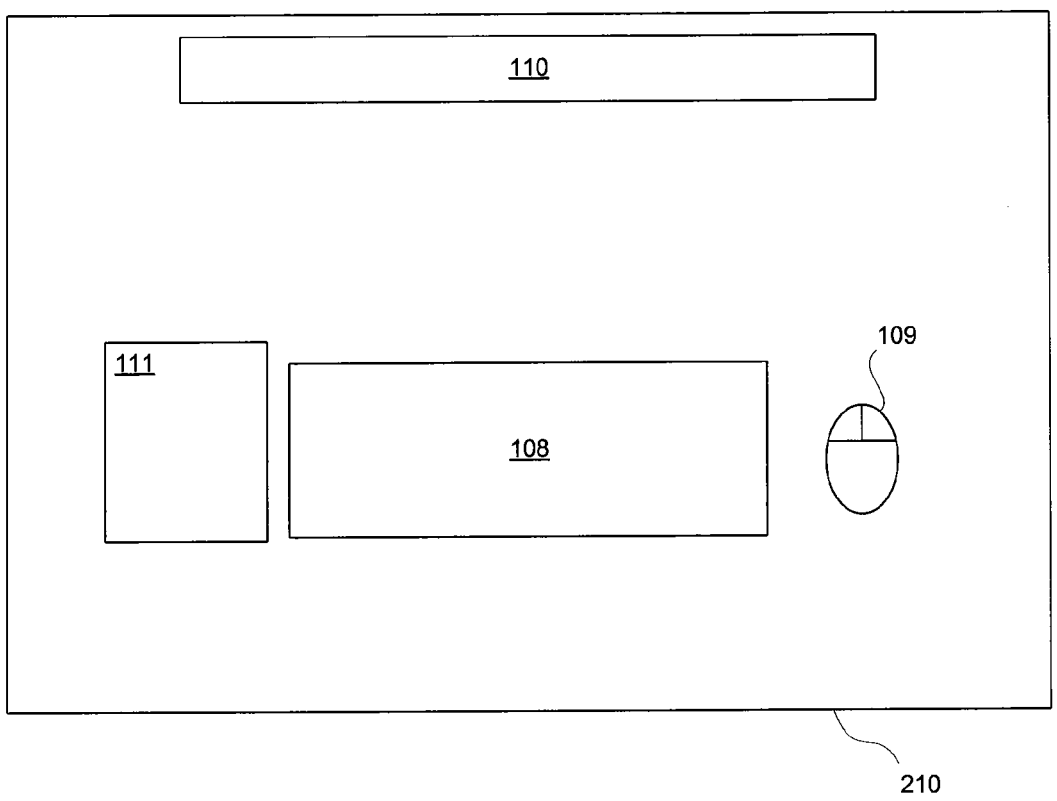
FIG. 2C is a top-view of a multi-touch desktop environment, according to yet another embodiment of the present invention.

FIG. 2C is a top-view of a multi-touch desktop environment 210, according to yet another embodiment of the present invention. As shown, the multi-touch desktop environment 210 implements secondary multi-touch display device 111 as a tablet device, such as an Apple iPad®, Apple iPhone®, multi-touch tablet computer, etc. In such embodiments, the secondary multi-touch display device 111 is positioned horizontally on a desktop surface in proximity to the other input devices included in desktop environment 210. As shown, secondary multi-touch display device 111 is positioned to the left of keyboard 108 in desktop environment 210 and may be connected to multi-touch desktop environment 210 in any technologically feasible way, such as via a communications path implemented using any suitable protocols such as USB, Bluetooth, or WiFi communications protocols.

In one embodiment, CPU 102 may be configured to display various tools on the tablet device and receive multi-touch input from the tablet device. In other embodiments, the tablet device may include an application configured to display a user interface tool that receives multi-touch input from the user and transmits the multi-touch input to CPU 102. It will be appreciated that one or more tablet devices may be included in multi-touch desktop environment 210 and positioned in different locations around keyboard 108 and mouse 109. Thus, multiple tools may be displayed on the one or more tablet devices at different positions relative to the input devices 108 and 109.

Figure 3A:
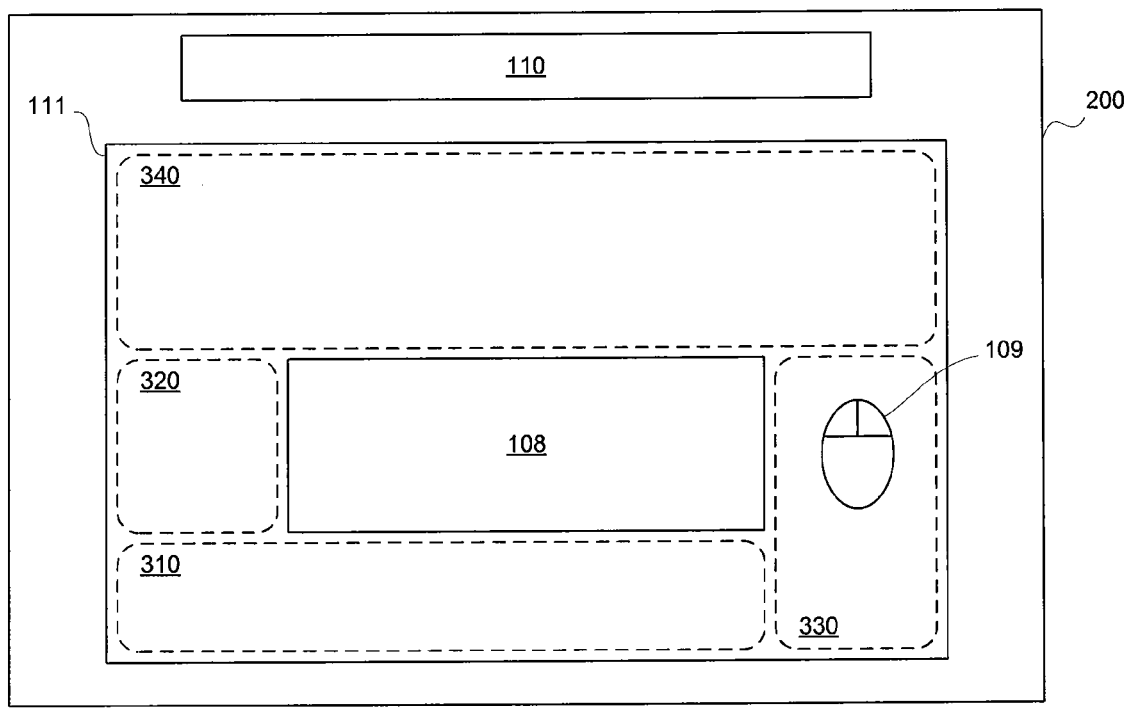
FIG. 3A illustrates a schematic diagram of multi-touch desktop environment of FIGS. 2A and 2B, according to one embodiment of the present invention.

FIG. 3A illustrates a schematic diagram of multi-touch desktop environment 200 of FIGS. 2A and 2B, according to one embodiment of the present invention. As shown, the secondary multi-touch display device 111 is divided into one or more multi-touch regions that implement various touch-sensitive tools to enhance user interactivity with the multi-touch desktop environment 200. These touch-sensitive tools include, without limitation, an enhanced task bar displayed in a first region 310 of the secondary multi-touch display device 111, a multi-functional touch pad displayed in a second multi-touch region 320, a digital mouse pad displayed in a third multi-touch region 330, and a continuous workspace displayed in a fourth multi-touch region 340. In one embodiment, an operating system executing on CPU 102 may define the size and location of the multi-touch regions 310, 320, 330 and 340 of secondary multi-touch display device 111. In alternative embodiments, the size and location of the regions may be defined by one or more applications such as application 150.

In one embodiment, as described in greater detail below in conjunction with FIGS. 5 and 6, the enhanced task bar 500 implemented in the first multi-touch region 310 is configured to enhance user interaction with the desktop graphics and application graphics displayed on primary display device 110. As described in greater detail below in conjunction with FIGS. 7A-7C and 8, the multi-functional touch pad 700 implemented in the second multi-touch region 320 provides users with configurable tools within easy finger reach of the keyboard 108 to facilitate interactions with the computer system coupled to the multi-touch desktop environment 200. For example, the multi-functional touch pad 700 may include tools for operating one or more frequently used software applications. As described in greater detail below in conjunction with FIGS. 9 and 10, the digital mouse pad 900 implemented in the third multi-touch region 330 is an area on which a physical mouse 109 can be placed. The digital mouse pad 900 is configured to track the movements of the physical mouse 109 and to provide other functionality to the user, such as a clipboard function.

As also shown, the fourth multi-touch region 340 may constitute a continuous workspace used as an extension of the primary display device 110. The end-user may drag windows from the primary display device 110 to the secondary multi-touch display device 111 using a cursor or a finger. In one embodiment, when a user drags a window from the primary display device 110 to the secondary multi-touch display device 111, an abstract version of the window is displayed in multi-touch region 340. In alternative embodiments, the full version of the window is displayed in multi-touch region 340.

In one embodiment, multi-touch region 340 may constitute all unused area of the display surface of secondary multi-touch display device 111. In alternative embodiments, multi-touch region 340 may be configured with a specific size and location in the secondary multi-touch display device 111.

One should note that the locations of the various touch-sensitive tools within the secondary multi-touch display device 111 may be changed according to user preferences. For example, a left-handed user may wish to place the digital mouse pad 900 on the left side of the secondary multi-touch display device 111 and the multi-functional touch pad 700 on the right side. In one embodiment, a particular layout configuration may be stored for each user of the multi-touch desktop environment 200. In such an embodiment, the secondary multi-touch display device 111 automatically adjusts to reflect a user's preferred layout configuration when the user logs in. A default layout configuration may be set for users who have not designated their own preferred layout configurations.

Figure 3B:
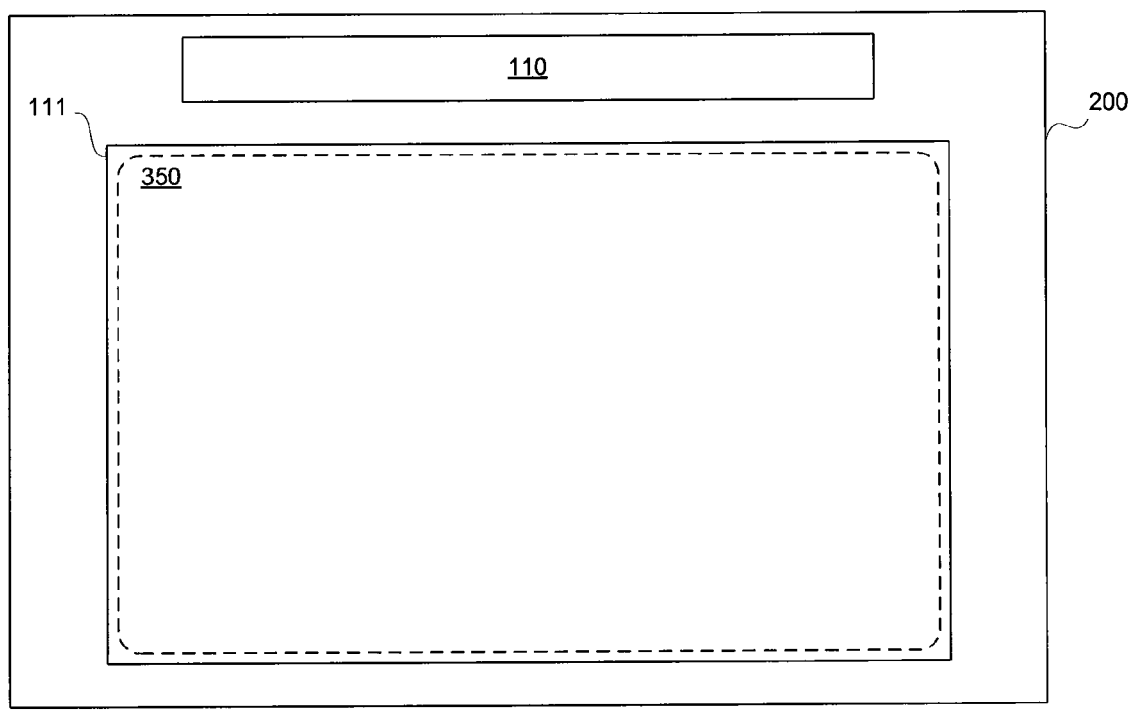
FIG. 3B illustrates a schematic diagram of the multi-touch desktop environment of FIG. 3A with the keyboard and mouse removed, according to another embodiment of the present invention.

FIG. 3B illustrates a schematic diagram of the multi-touch desktop environment 200 of FIG. 3A with the keyboard 108 and mouse 109 removed, according to another embodiment of the present invention. As shown, when the keyboard 108 and mouse 109 are removed from the multi-touch desktop environment 200 of FIG. 3A, multi-touch regions 310, 320, 330, and 340 are hidden, and multi-touch region 350 automatically expands to essentially the entire display area of secondary multi-touch display device 111. In alternative embodiments, multi-touch region 350 may be configured to have a particular size and location such that multi-touch region 350 constitutes only a portion of the display area of secondary multi-touch display device 111.

Multi-touch region 350 may be configured to display application graphics in place of primary multi-touch display device 110. In one embodiment, the active window in primary multi-touch display device 110 is automatically displayed in multi-touch region 350. For example, if a map is displayed in the active window in primary multi-touch display device 110, the map may be displayed in the entire display area of secondary multi-touch display device 111 quickly and automatically simply by moving keyboard 108 and mouse 109 off the secondary multi-touch display device 111.

In addition to enabling two-handed interactions and augmenting keyboard 108 and mouse 109 inputs, multi-touch region 350 may constitute a continuous workspace. An end-user can freely move windows between primary display device 110 and secondary multi-touch display device 111 using fingers or a cursor to take advantage of extra display surface. In one embodiment, when a window is dragged from primary display device 110 to secondary multi-touch display device 111, the size of user-interface (UI) elements in the dragged window are enlarged to suit finger scale interaction. In addition, in one embodiment, UI elements may be rearranged to be close to keyboard 108 to provide a better user interaction with secondary multi-touch display device 111. In yet another embodiment, windows being displayed in secondary multi-touch display device 111 may shift from full versions to abstract versions to allow users to absorb the most useful information with a simple glance.

Figure 3C:
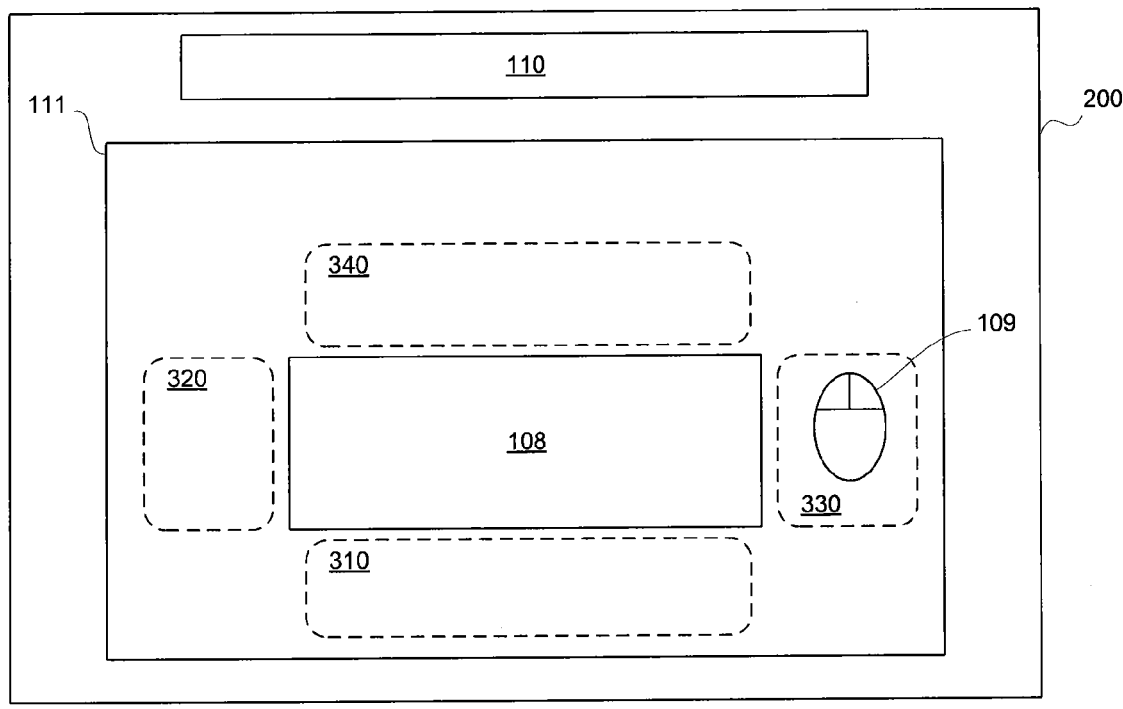
FIGS. 3C through 3E illustrate schematic diagrams of the multi-touch desktop environment of FIG. 3A, according to various alternative embodiments of the present invention.
Figure 3D:
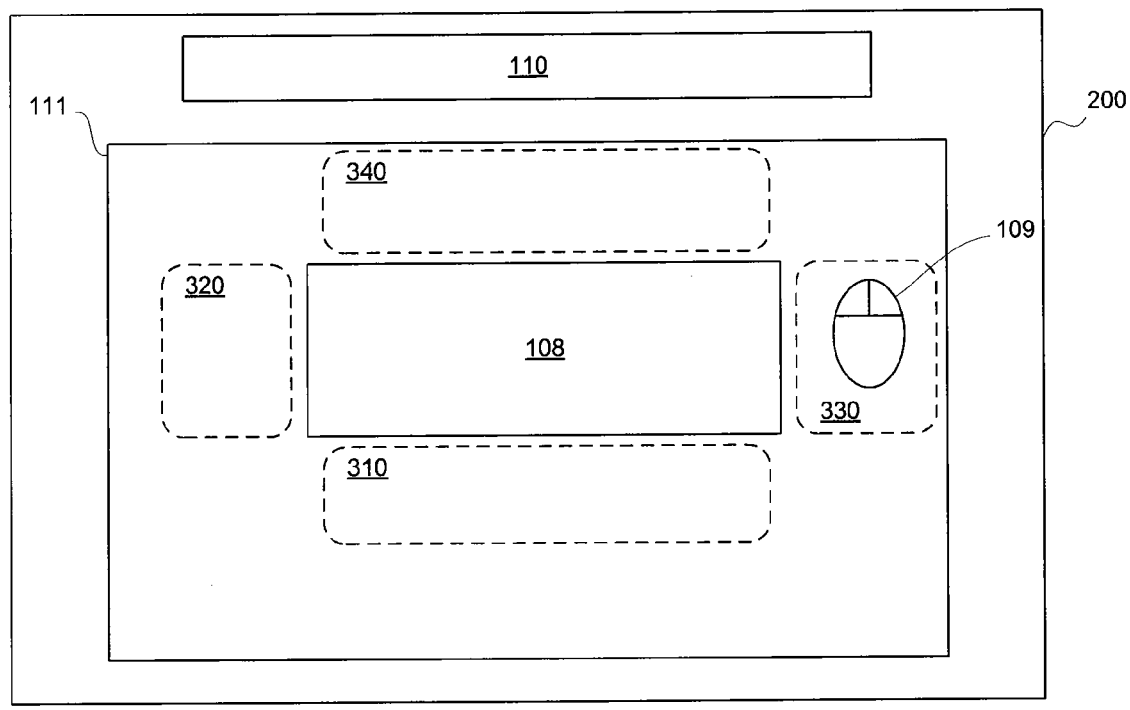
Figure 3E:
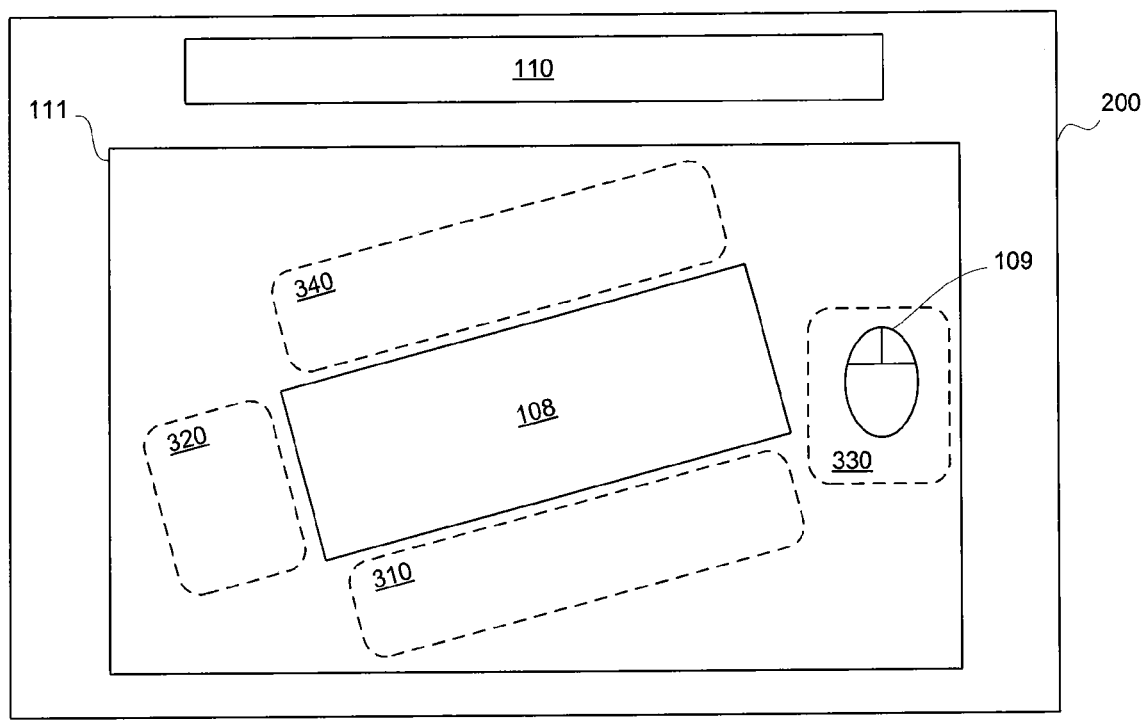

FIGS. 3C through 3E illustrate schematic diagrams of the multi-touch desktop environment 200 of FIG. 3A, according to various alternative embodiments of the present invention. The multi-touch regions 310, 320, 330, and 340 may be configured to have a size and position relative to the location of keyboard 108 and/or mouse 109. The multi-touch regions 310, 320, 330, and 340 may also be configured such that the total area of all regions is less than the total display area of secondary multi-touch display device 111. For example, as shown in FIG. 3C, multi-touch regions 310 and 340 are sized to be essentially as long as keyboard 108 and located directly below and above keyboard 108, respectively. Similarly, multi-touch regions 320 and 330 are sized to be essentially as wide as keyboard 108 and located directly to the left and right of keyboard 108, respectively.

As shown in FIG. 3D, when keyboard 108 is repositioned on secondary multi-touch display device 111, the location of multi-touch regions 310, 320, 330, and 340 is adjusted accordingly. In one embodiment, when keyboard 108 is moved to the top of secondary multi-touch display device 111 such that the area between the keyboard 108 and the top of the display area of secondary multi-touch display device 111 is less than the area of multi-touch region 340, the location of multi-touch region 340 may be adjusted to be displayed directly below keyboard 108. In such embodiments, multi-touch regions 310, 320 and 330 may be positioned below, to the left, and to the right of region 340 such that multi-touch region 340 essentially switches positions with keyboard 108 in the relative layout of the keyboard 108 and the various multi-touch regions. Also, in such embodiments, when the user moves keyboard 108 back down such that the area between the keyboard 108 and the top of the display area of secondary multi-touch display device 111 is more than the area of multi-touch region 340, multi-touch regions 310, 320, 330, and 340 are adjusted such that the original configuration of the multi-touch regions with respect to the input devices is restored.

The various multi-touch regions of multi-touch desktop environment 200 may be individually associated with the location and orientation of the keyboard 108 and mouse 109. For example, as shown in FIG. 3E, multi-touch regions 310, 320, and 340 are associated with keyboard 108 and multi-touch region 330 is associated with mouse 109. As also shown in FIG. 3E, the orientation of the multi-touch regions 310, 320, 330, and 340 on secondary multi-touch display device 111 may be adjusted based on the orientation of keyboard 108 or mouse 109, individually. For example, as keyboard 108 is rotated on secondary multi-touch display device 111 with respect to an axis defined by the lower edge of secondary multi-touch display device 111, multi-touch regions 310, 320, and 340 are rotated by a corresponding amount such that the orientation of the multi-touch regions remains fixed relative to the orientation of the keyboard 108.

In one or more embodiments, secondary multi-touch display device 111 does not cover substantially the entire desktop surface area. For example, one of the various tools may be implemented on a tablet device such as an Apple iPad®, Apple iPhone®, multi-touch tablet computer, etc. In this example, the tablet device may be placed on the user's desk with the touch screen monitor facing up and at a position that corresponds with one of the multi-touch regions 310,320, 330 or 340 that is conveniently within reach of a user's fingers while the user operates keyboard 108. The tablet device may implement one of the various tools, such as a multi-functional touchpad 700.

In other embodiments, two or more multi-touch display devices may be implemented in multi-touch desktop environment 200 in place of secondary multi-touch display device 111. For example, each of the two or more multi-touch display devices may implement a separate tool and be located in a different location relative to keyboard 108. A first tablet device configured to implement a multi-functional touchpad 700 may be placed to the left of the keyboard 108. Simultaneously, a second tablet device configured to implement an enhanced task bar 500 may be placed below keyboard 108. Additional tablet devices may be placed in the multi-touch desktop environment 200 to implement other multi-touch tools. It will be appreciated that in such instances where tablet devices placed in proximity to the keyboard 108 are configured to implement parts of the present invention, the functionality of adjusting the multi-touch regions 310, 320, 330 and 340 in response to moving the keyboard 108 on the secondary multi-touch display device 111 may not be enabled.

Figure 4:
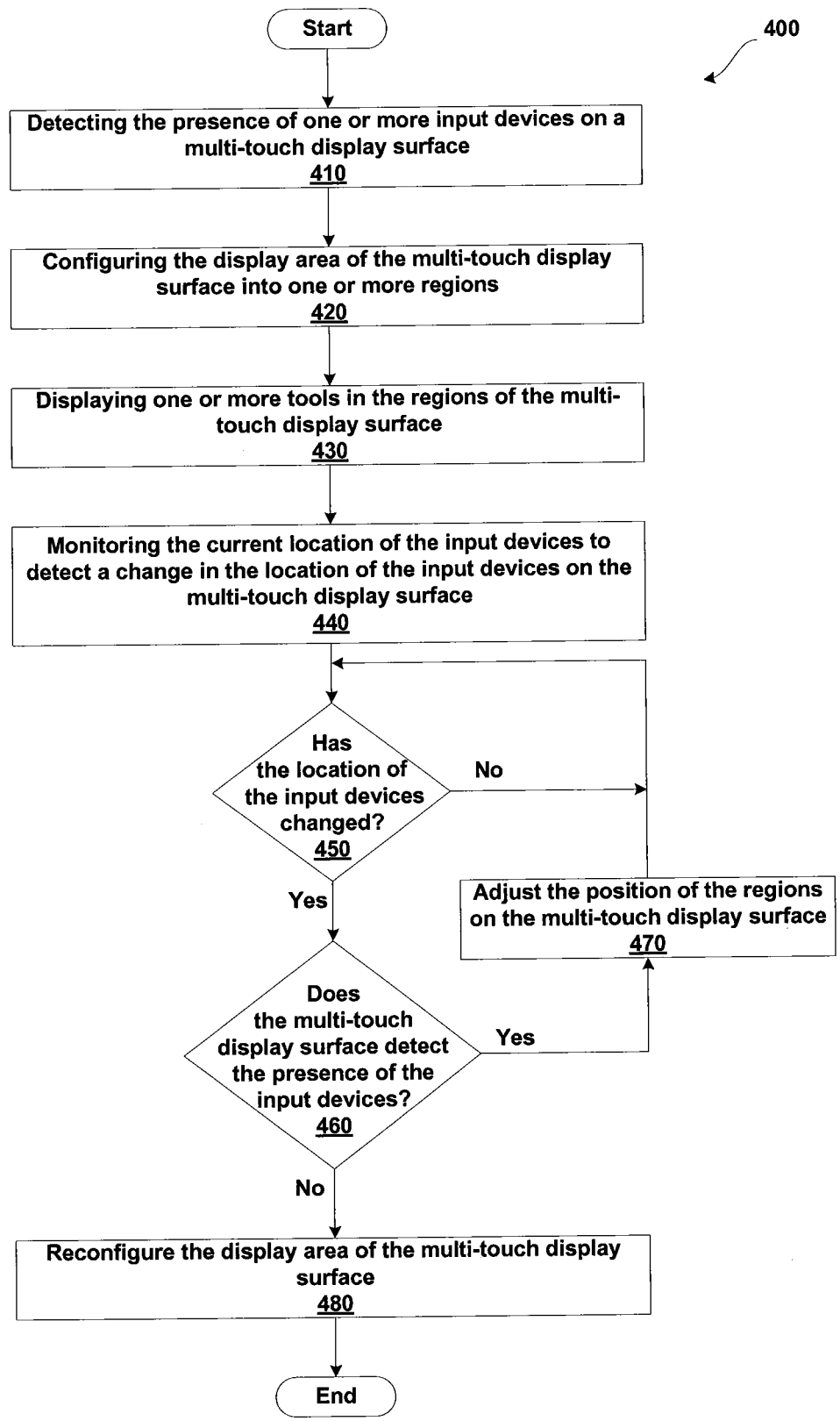
FIG. 4 is a flow diagram of method steps for configuring a multi-touch surface in the multi-touch desktop environment, according to one embodiment of the present invention.

FIG. 4 is a flow diagram of method steps for configuring a multi-touch surface in the multi-touch desktop environment 200, according to one embodiment of the present invention. Although the method steps are described in conjunction with the systems of FIGS. 1, 2A-2C, and 3A-3E, persons skilled in the art will understand that any system configured to perform the method steps, in any order, is within the scope of the present invention.

The method 400 begins at step 410, where a CPU 102 detects the presence of one or more input devices 108 and 109 on the display surface of the secondary multi-touch display device 111. At step 420, CPU 102 configures the display area of secondary multi-touch display 111 into one or more defined areas such as multi-touch regions 310, 320, 330 and 340. In one embodiment, the size and location of the one or more multi-touch regions 310, 320, 330 and 340 are dependent on the location of the input devices 108 and 109 on the display surface of the secondary multi-touch display device 111.

At step 430, CPU 102 is configured to display one or more tools in the multi-touch regions 310, 320, 330 and 340 of secondary multi-touch display device 111. Various tools may include an enhanced task bar 500, a multi-functional touch pad 700, or a digital mouse pad 900. Other regions may be implemented as a continuous workspace of primary multi-touch display device 110. It will be appreciated that any types of tools may be implemented in the various display regions of secondary multi-touch display device 111 and are within the scope of the present invention.

At step 440, CPU 102 monitors the location of the input devices 108 and 109 on the display surface of the secondary multi-touch display device 111. In one embodiment, CPU 102 may be configured to adjust the location of the one or more multi-touch regions 310, 320, 330 and 340 of the secondary multi-touch display device 111 in response to detecting that the location of the input devices 108 and 109 on the secondary multi-touch display device 111 has changed. At step 450, CPU 102 determines if the location of the input devices 108 and 109 has changed. If the location of the input devices 108 and 109 has not changed, then CPU 102 waits until the user moves the input devices 108 and 109. However, if CPU 102 detects that the location of the input devices 108 and 109 has changed, the method 400 proceeds to step 460.

At step 460, CPU 102 determines whether the input devices 108 and 109 are detected on the secondary multi-touch display device 111. If the input devices 108 and 109 are detected on the secondary multi-touch display device 111, then method 400 proceeds to step 470, where CPU 102 may be configured to adjust the location of the multi-touch regions 310, 320, 330 and 340 in secondary multi-touch display device 111 in relation to the position of input devices 108 and 109.

Returning now to step 460, if CPU 102 does not detect the input devices 108 and 109 on the secondary multi-touch display device 111, then method 400 proceeds to step 480, where CPU 102 may be configured to reconfigure the regions 310, 320, 330, and 340 in the secondary multi-touch display device 111. In one embodiment, CPU 102 is configured to generate a single region in the secondary multi-touch display device 111 that covers essentially the entire area of the display surface. In alternative embodiments, CPU 102 may be configured to resize or reposition one or more of multi-touch regions 310, 320, 330, and 340 in the secondary multi-touch display device 111. After step 480, method 400 terminates.

It will be appreciated that system 100 may be configured to perform the steps of method 400 whenever CPU 102 detects input devices placed on the display surface of the secondary multi-touch display device 111. In this manner, the CPU 102 may be configured to adjust secondary multi-touch display device 111 between one or more configurations based on the presence or location of input devices on the multi-touch surface.

The present invention contemplates a variety of tools that may be configured to be displayed in the regions of secondary multi-touch display device 111. Three of those tools (enhanced task bar 500, multi-functional touch pad 700, and digital mouse pad 900) are described in greater detail below. In alternative embodiments, other tools may be implemented in various multi-touch regions of secondary multi-touch display device 111.

Enhanced Task Bar

Figure 5:
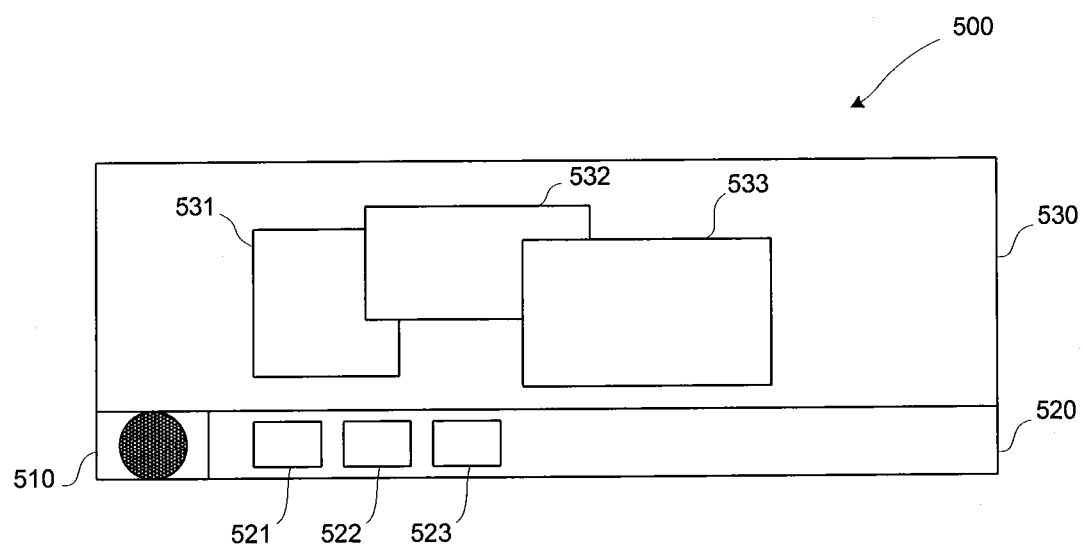
FIG. 5 illustrates an enhanced task bar, according to one embodiment of the present invention.

FIG. 5 illustrates an enhanced task bar 500, according to one embodiment of the present invention. In one embodiment, the enhanced task bar 500 may be displayed in multi-touch region 310 of multi-touch desktop environment 200. As shown in FIG. 5, enhanced task bar 500 includes a start menu icon 510 and task bar 520 as well as a window management region 530. Start menu icon 510 provides users with access to a conventional start menu for initiating applications or opening documents such as the start menu included in Microsoft's Windows Operating System™. Task bar 520 displays icons 521, 522, and 523 representing windows displayed in primary display device 110. In one embodiment, icons 521, 522, and 523 represent windows minimized in primary display device 110. In other alternative embodiments, icons 521, 522, and 523 may represent shortcuts that are pinned to task bar 520.

Window management region 530 displays thumbnails 531, 532, and 533 representing windows displayed in primary display device 110. In one embodiment, the location and size of thumbnails 531, 532, and 533 in window management region 530 conveys the spatial location and size of windows in primary display device 110. Thumbnails 531, 532, and 533 may be displayed partially transparent in window management region 530 so that even if windows are partially or totally occluded by other windows the user is able to see where a window is located in primary display device 110. In alternative embodiments, window management region 530 has a wider aspect ratio than primary display device 110 thus allowing thumbnails 531, 532, and 533 to be spread out more than the corresponding windows on primary display device 110. Therefore, users may see and access windows more freely in window management region 530 compared to primary display device 110.

The enhanced task bar 500 enables users to simultaneously manage multiple windows with two hands using various multi-touch gestures. For example, a user may resize a window associated with thumbnail 531 by moving two fingers together or apart on thumbnail 531 in window management region 530 to shrink or expand the size of the window. By moving two fingers together/apart horizontally, the window is resized in width only. By moving two fingers together/apart vertically, the window is resized in height only. By moving two fingers together/apart diagonally, the window is resized in both width and height simultaneously. Minimizing a window may be accomplished by flicking the thumbnail 531 down in window management region 530 such that the thumbnail 531 is hidden in window management region 530 and an icon 521 representing the window is displayed on task bar 520. Maximizing the window may be accomplished by double tapping the thumbnail 531 in window management region 530 or flicking the icon 521 (if the window is minimized in primary multi-touch display device 110) up from the task bar 520. A window in primary display device 110 may be moved by touching and dragging the corresponding thumbnail 531 in window management region 530. Many other multi-touch gestures may be configured to perform operations in enhanced task bar 500 and are within the scope of the present invention.

Figure 6:
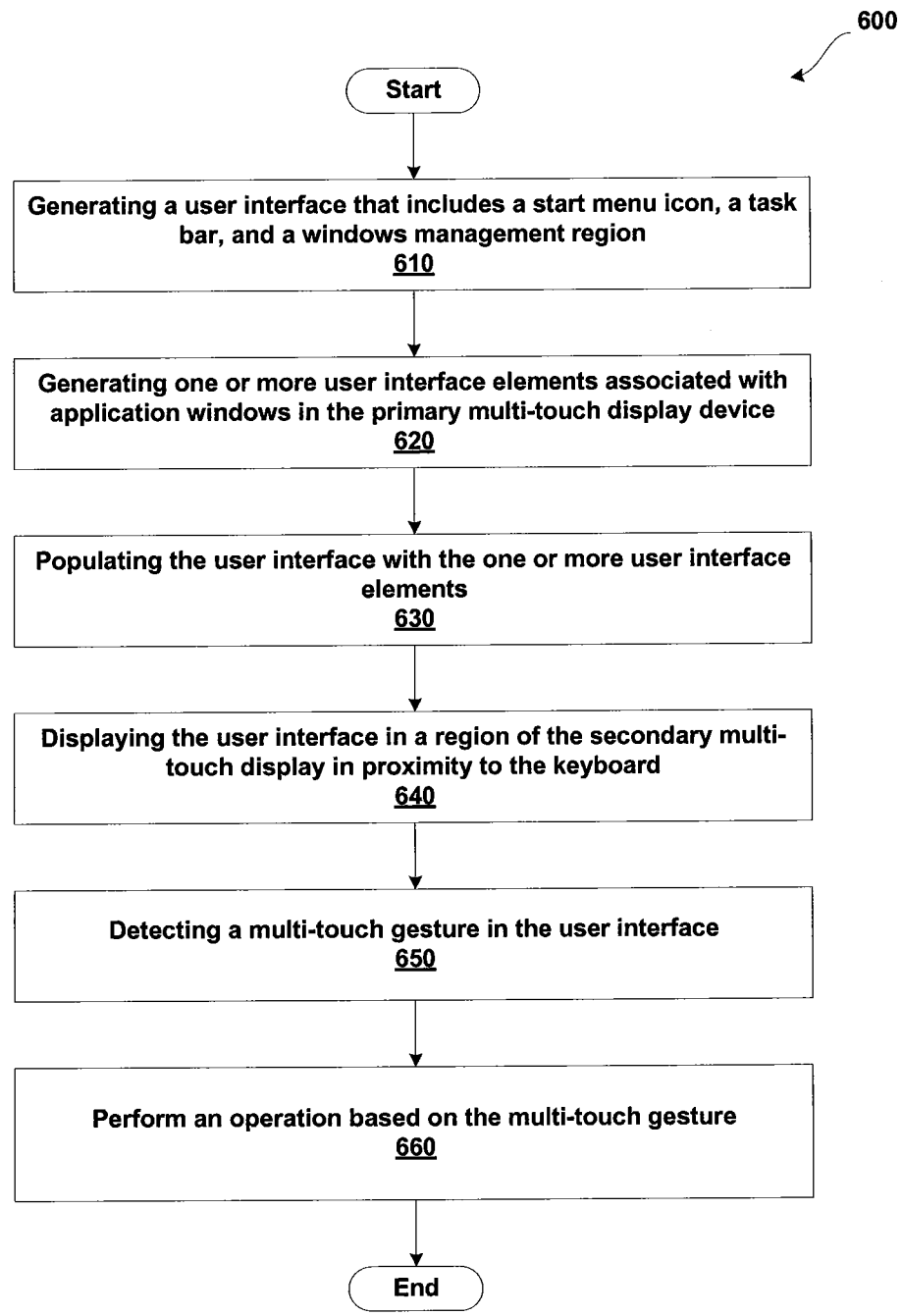
FIG. 6 is a flow diagram of method steps for configuring an enhanced task bar in a multi-touch desktop environment, according to one embodiment of the present invention.

FIG. 6 is a flow diagram of method steps 600 for configuring an enhanced task bar 500 in a multi-touch desktop environment 200, according to one embodiment of the present invention. Although the method steps are described in conjunction with the systems of FIGS. 1, 2A-2C, 3A-3E and 5, persons skilled in the art will understand that any system configured to perform the method steps, in any order, is within the scope of the inventions.

Method 600 begins at step 610, where CPU 102 generates an enhanced task bar 500 user interface that includes a start menu icon 510, a task bar 520, and a windows management region 530. At step 620, CPU 102 generates one or more user interface elements associated with windows open in the primary display device 110. In one embodiment, CPU 102 generates icons 521, 522, and 523 representing windows minimized in primary display device 110, and thumbnails 531, 532, and 533 representing windows displayed in primary display device 110. At step 630, CPU 102 populates the enhanced task bar 500 with the user interface elements generated in step 620. Icons 521, 522, and 523 may be added to task bar 520, and thumbnails 531, 532, and 533 may be displayed in the windows management region 530. In one embodiment, the location and size of thumbnails 531, 532, and 533 in window management region 530 conveys the spatial location and size of windows in primary display device 110. In alternative embodiments, window management region 530 has a wider aspect ratio than primary display device 110 to allow easier access to thumbnails for a user.

At step 640, CPU 102 causes enhanced task bar 500 to be displayed in a multi-touch region of the secondary multi-touch display device 111. In one embodiment, the multi-touch region may be defined as an area located below keyboard 108 in secondary multi-touch display device 111, such as region 310. Displaying the enhanced task bar 500 in proximity to keyboard 108 enables a user to efficiently transition between keyboard input and multi-touch input.

At step 650, CPU 102 detects multi-touch gestures in the enhanced task bar 500. For example, if a user touches secondary multi-touch display device 111 in the area corresponding to the start menu icon 510, the start menu may be opened in primary display device 110. At step 660, CPU performs an operation based on the multi-touch gesture detected in enhanced task bar 500. Multi-touch gestures associated with window management operations include moving two fingers together or apart over a thumbnail 531 to resize a window, double tapping the thumbnail 531 to maximize the window, flicking a thumbnail 531 down to minimize the window, flicking an icon 521 up to restore a window, and dragging a thumbnail 531 to move a window in primary display device 110. Other multi-touch gestures associated with window management operations are contemplated and within the scope of the present invention.

Multi-Functional Touch Pad

Figure 7A:
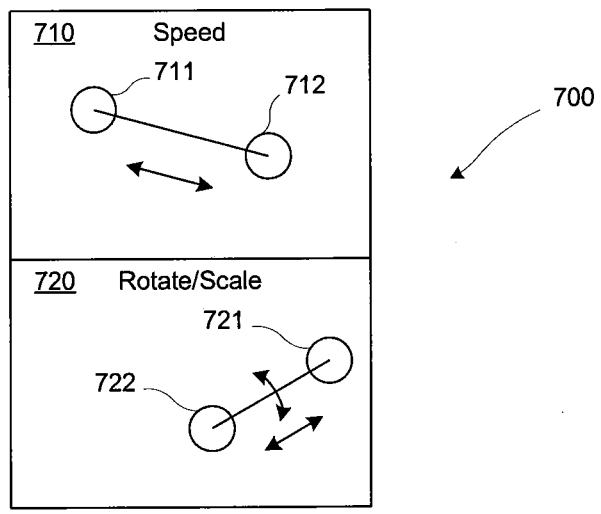
FIGS. 7A-7C illustrate aspects of a multi-functional touch pad, according to various embodiments of the present invention.
Figure 7B:
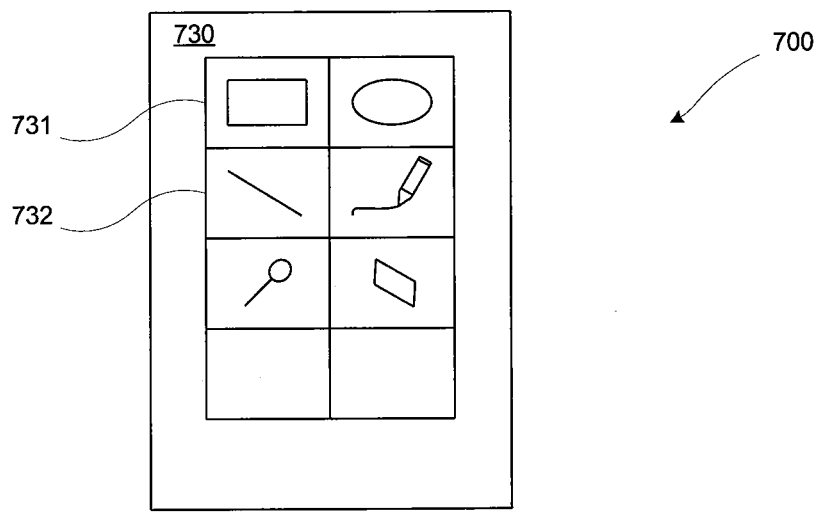
Figure 7C:
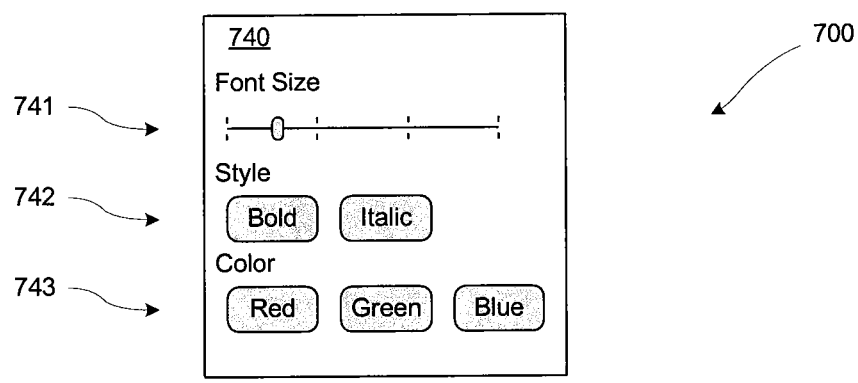

FIGS. 7A-7C illustrate aspects of a multi-functional touch pad 700, according to various embodiments of the present invention. Multi-functional touch pad 700 is configured to display various tools designed to enhance user interactivity with applications executing on system 100. For example, as shown in FIG. 7A, multi-functional touch pad 700 may be configured to display a tool for adjusting the speed or gain of a mouse 109. Toolbar 710 defines a region of multi-functional touch pad 700 that enables a user to adjust the speed of a mouse by moving together or pulling apart two fingers touching the multi-touch surface. Touch point 711 and touch point 712 represent two points touched by the user within the region defined by toolbar 710. If the user moves touch point 711 towards touch point 712 then the mouse gain is decreased and the mouse moves slower. In contrast, if the user moves touch point 711 away from touch point 712 then the mouse gain is increased and the mouse moves faster. Toolbar 710 represents a tool that implements a single degree of freedom.

In contrast, as also shown in FIG. 7A, multi-functional touch pad 700 may implement a tool with two or more degrees of freedom. For example, multi-functional touch pad 700 may be configured to display a tool for performing rotation and scale manipulations of objects displayed on primary display device 110. Specifically, toolbar 720 implements a tool with two degrees of freedom for manipulating an object. A first degree of freedom enables a user to adjust the scale of the object by moving touch point 721 towards or away from touch point 722. A second degree of freedom enables a user to also rotate the object simultaneously by rotating touch point 722 around touch point 721.

In different embodiments, multi-functional touch pad 700 may be configured to implement other tools including, but not limited to, audio visual controls, a secondary cursor, or drawing tools and the like. For example, as shown in FIG. 7B, multi-functional touch pad 700 may be configured to display a customizable tool palette 730 that includes application-specific icons (731, 732, etc.) for selecting various tools within an application 150. In one embodiment, application 150 may be a drawing application that enables a user to draw on a digital canvas. In such a case, a user may select the tool associated with icon 731, such as a rectangle tool, using multi-functional touch pad 700. In this manner, the user may select the tool associated with one of the icons (731, 732, etc.) using the multi-functional touch pad 700 while keeping the primary cursor in focus on the digital canvas. Customizable tool palette 730 may serve as a repository for storing commonly used UI elements.

In alternative embodiments, customizable tool palette 730 may be configured to add or remove tools according to user preferences. Thus, if a user rarely uses a particular tool, then the user can remove that tool from customizable tool palette 730. Similarly, the user may add a new tool to customizable tool palette 730 to provide easy access to a frequently used tool in application 150. For example, a tool may be removed from the customizable tool palette 730 by dragging the icon 731 out of the multi-functional touch pad 700. In contrast, to add a tool to customizable tool palette 730, a user may flick a tool icon in the main application window down in primary display device 110. In response to such a multi-touch gesture, the icon 731 automatically appears in customizable tool palette 730. In alternative embodiments, a user may drag the tool icon from primary display device 110 to secondary multi-touch display device 111. The icon 731 then appears in a continuous workspace in secondary multi-touch display device 111 such as the continuous workspace defined in multi-touch region 340. From the continuous workspace, the user may then place the icon in the customizable tool palette 730 by dragging the icon 731 from the continuous workspace to the multi-functional touch pad 700.

In yet other embodiments, multi-functional touch pad 700 may be configured to display a tool for adjusting the font characteristics in a text editor (or other associated application). For example, as shown in FIG. 7C, toolbar 740 may be displayed in multi-functional touch pad 700. Toolbar 740 may be configured with digital buttons or other UI elements that enable a user to change a font's size, color, or style. Toolbar 740 includes a horizontal slider 741 to adjust a font's size, digital buttons 742 to adjust a font's style, and digital buttons 743 to adjust a font's color. As shown, digital buttons 742 and 743 are configured to change the font's style or color in response a user touching the digital buttons 742 or 743 on the multi-touch surface. It will be appreciated that digital buttons 742 or 743 may be other UI elements such as a drop-down list or a color palette.

Multi-functional touch pad 700 may be configured to display tools associated with the active window in primary display device 110. Thus, when a user switches the active window in primary display device 110, multi-functional touch pad 700 may be configured to switch the particular tool displayed in the multi-touch region. For example, when the active window in primary display device 110 is a text editor, multi-functional touch pad 700 may be configured to display toolbar 740. However, if the user then switches the active window to a drawing application, multi-functional touch pad 700 may be configured to hide toolbar 740 and display customizable tool palette 730. It will be appreciated that multi-functional touch pad 700 may be configured with any number of tools that provide a user with various functions for a plurality of applications. The list described above in conjunction with FIGS. 7A-7C is not to be construed as limiting, and tools other than those described are within the scope of the present invention.

Figure 8:
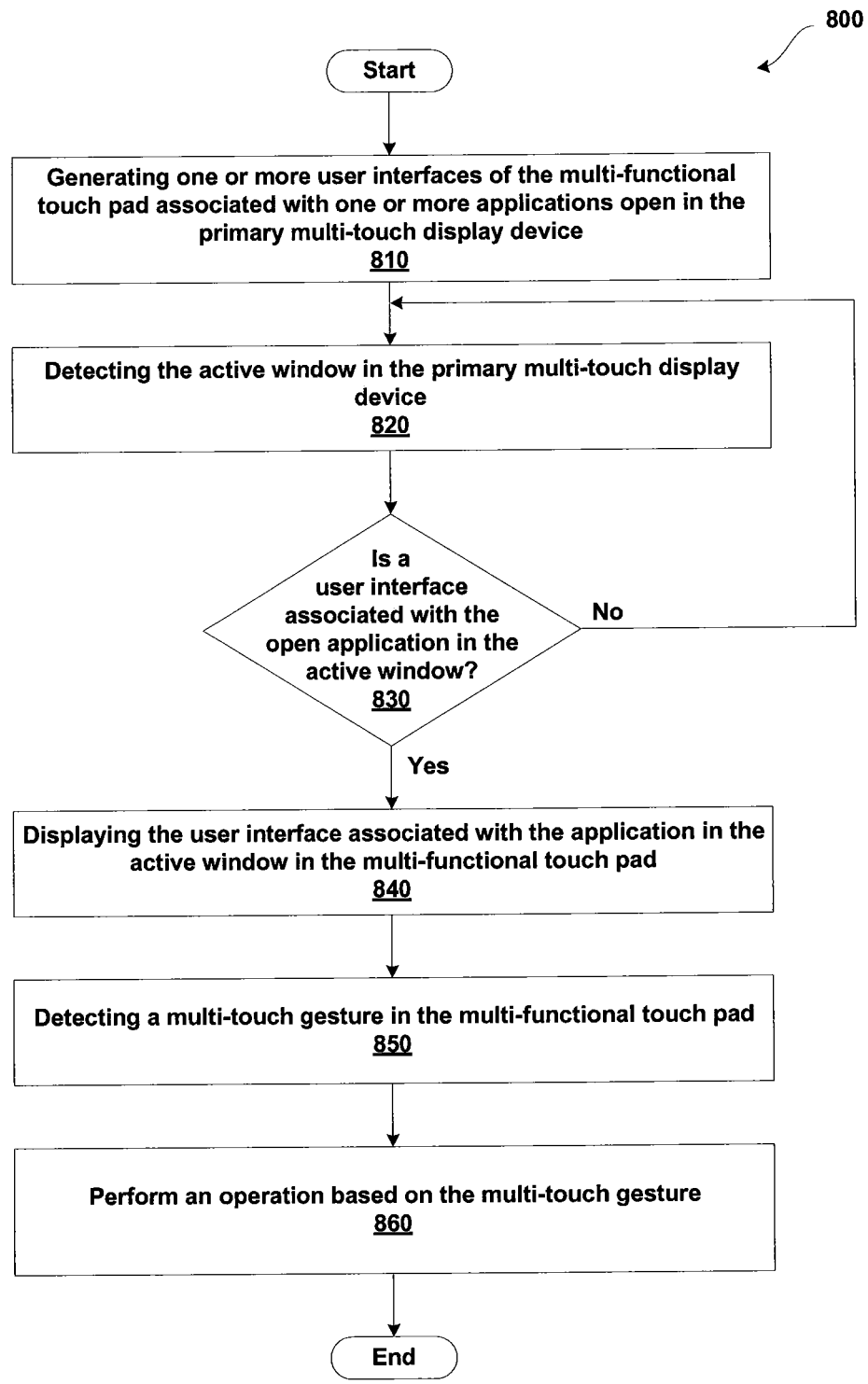
FIG. 8 is a flow diagram of method steps for configuring a multifunctional touch pad in a multi-touch desktop environment, according to one embodiment of the present invention.

FIG. 8 is a flow diagram of method steps 800 for configuring a multifunctional touch pad 700 in a multi-touch desktop environment 200, according to one embodiment of the present invention. Although the method steps are described in conjunction with the systems of FIGS. 1, 2A-2C, 3A-3E and 7A-7C, persons skilled in the art will understand that any system configured to perform the method steps, in any order, is within the scope of the inventions.

The method 800 begins at step 810, where CPU 102 generates one or more user interfaces such as toolbar 710, toolbar 720, customizable tool palette 730, or toolbar 740. Each user interface may be associated with one or more of the open applications in primary display device 110. At step 820, CPU 102 detects the active window in primary display device 110. At step 830, CPU 102 determines whether one of the user interfaces generated in step 810 is associated with the application corresponding to the active window in primary display device 110. For example, in the case where the user interface is customizable tool palette 730, CPU 102 determines whether the application corresponding to the active window is a drawing application. If no user interface is associated with the application corresponding to the active window, method 800 returns to step 820, where CPU 102 waits until focus is shifted to a different window in primary display device 110.

Returning now to step 830, if one of the user interfaces is associated with the application corresponding to the active window, method 800 proceeds to step 840, where the user interface is displayed in a multi-touch region of the secondary multi-touch display device 111. In one embodiment, the multi-functional touchpad 700 is displayed in multi-touch region 320 in secondary multi-touch display device 111. In alternative embodiments, multi-functional touch pad 700 may be displayed in a different region of the secondary multi-touch display device 111 such as multi-touch region 330.

At step 850, CPU 102 detects multi-touch gestures in the multi-functional touch pad 700. For example, in the case where multi-functional touch pad is customizable tool palette 730, a user may touch secondary multi-touch display device 111 in the area corresponding to icon 731 to select the tool associated with icon 731 such as a rectangle tool. The particular user interface generated for multi-functional touch pad 700 may define various multi-touch gestures for providing input. For example, customizable tool palette 730 may only recognize point input. In contrast, toolbar 720 may recognize two degree of freedom multi-touch input for performing rotation and scaling operations. At step 860, CPU 102 performs an operation based on the multi-touch gesture detected in multi-functional touch pad 700.

Digital Mouse Pad

Figure 9:
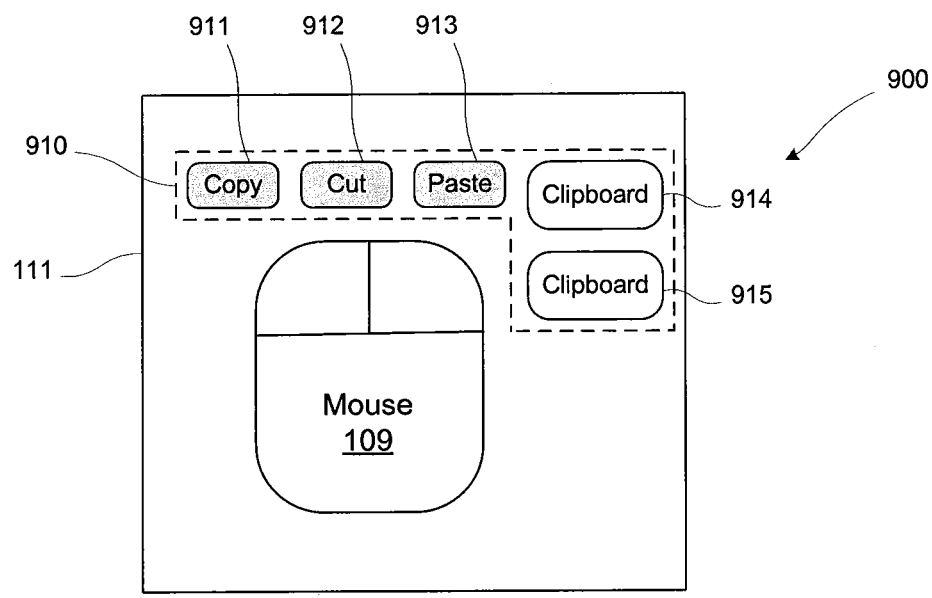
FIG. 9 illustrates a digital mouse pad, according to one embodiment of the present invention.

FIG. 9 illustrates a digital mouse pad 900, according to one embodiment of the present invention. The digital mouse pad 900 may be associated with a multi-touch region of secondary multi-touch display device 111. Digital mouse pad 900 tracks the location of mouse 109 on secondary multi-touch display device 111. In one embodiment, digital mouse pad 900 is configured to display user interface (UI) elements 910 in proximity to mouse 109. The UI elements may be configured to enable a user to perform various functions conventionally selected through the right-click menu. In alternative embodiments, UI elements 910 may remain fixed at a specific location on the secondary multi-touch display device 111 such as around the perimeter of the multi-touch region associated with digital mouse pad 900.

As shown in FIG. 9, digital mouse pad 900 may display digital buttons 911, 912, and 913 for copy, cut, and paste clipboard operations, respectively. For example, a user could highlight an object using the mouse 109 and then touch the copy digital button 911 to copy the highlighted object to the clipboard. In one embodiment, when a user adds an object to the clipboard, the object is displayed in a thumbnail (914, 915, etc.) to the right of the mouse 109. Thumbnails may display both textual and graphical contents. The clipboard may store one or more objects associated with thumbnails (914, 915, etc.) displayed in proximity to the mouse 109 on secondary multi-touch display device 111. The user may use the paste digital button 913 to paste the last object copied to the clipboard at the current cursor location. The user may also touch the thumbnail (914, 915, etc.) associated with a particular object on the clipboard to paste that object at the current cursor location.

It will be appreciated that digital mouse pad 900 enables a user to efficiently select operations associated with a mouse 109 that may have taken multiple steps using conventional techniques. In addition, digital mouse pad 900 enables a user to quickly view multiple objects stored in the clipboard simultaneously and select a particular object to paste in an application from among a plurality of objects. It will also be appreciated that digital mouse pad 900 may be configured with any number of UI elements that provide a user with various functions for a plurality of applications. The list described above in conjunction with FIG. 9 is not to be construed as limiting, and UI elements other than those described are within the scope of the present invention.

Figure 10:
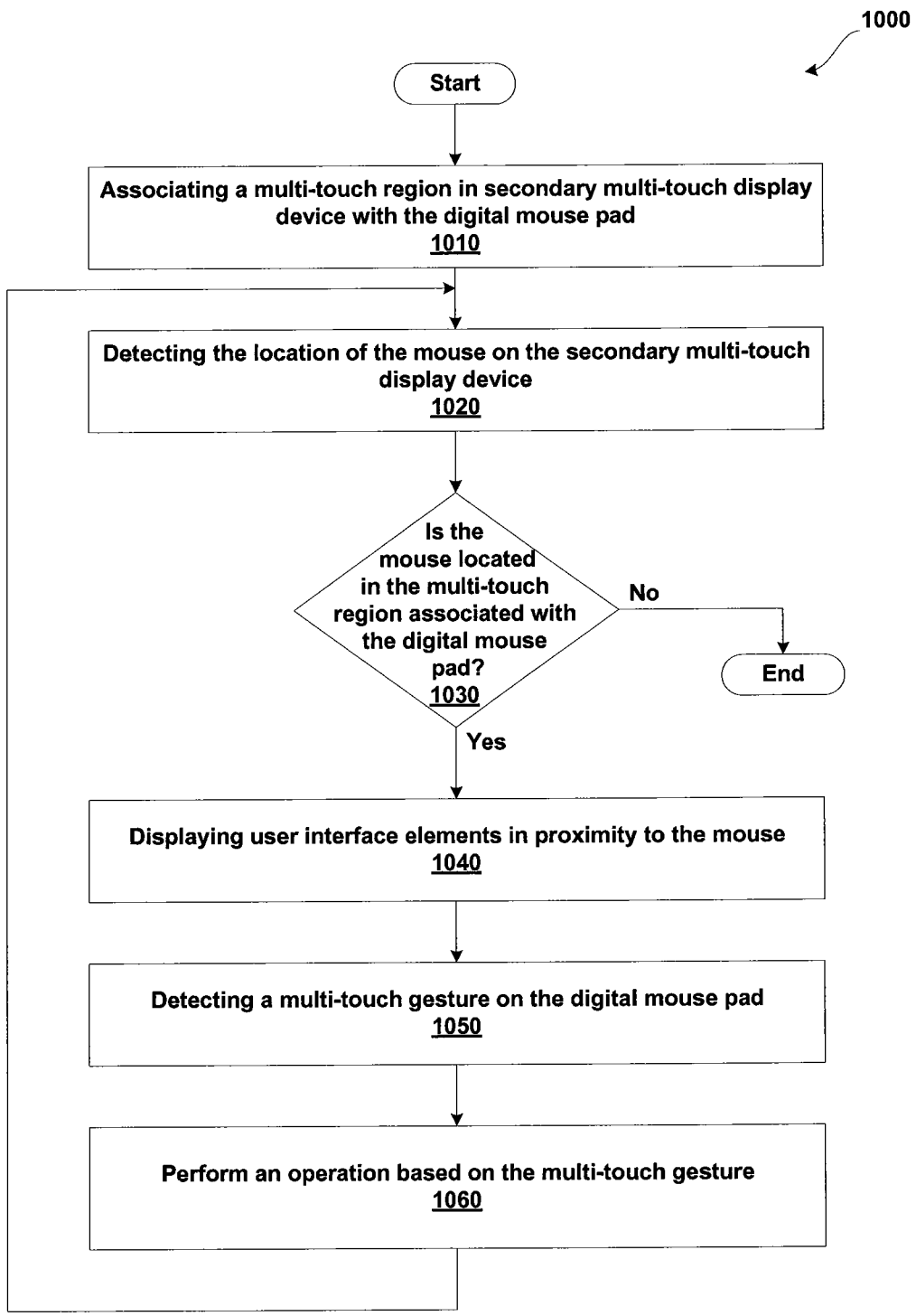
FIG. 10 is a flow diagram of method steps for configuring a digital mouse pad in a multi-touch desktop environment, according to one embodiment of the present invention.

FIG. 10 is a flow diagram of method steps 1000 for configuring a digital mouse pad 900 in a multi-touch desktop environment 200, according to one embodiment of the present invention. Although the method steps are described in conjunction with the systems of FIGS. 1, 2A-2C, 3A-3E and 9, persons skilled in the art will understand that any system configured to perform the method steps, in any order, is within the scope of the inventions.

The method 1000 begins at step 1010, where CPU 102 associates a multi-touch region of secondary multi-touch display device 111 with the digital mouse pad 900. In one embodiment, multi-touch region 330 is associated with digital mouse pad 900 such that the digital mouse pad 900 is located to the right of keyboard 108. When mouse 109 moves out of the multi-touch region associated with the digital mouse pad 900, digital mouse pad 900 may be hidden. In alternative embodiments, CPU 102 may be configured to track mouse 109 on secondary multi-touch display device 111 to adjust the location of the multi-touch region associated with the digital mouse pad 900 such that the position of digital mouse pad 900 remains fixed relative to mouse 109.

At step 1020, CPU 102 detects the location of mouse 109 on secondary multi-touch display device 111. At step 1030, CPU 102 determines whether mouse 109 is located in the multi-touch region associated with digital mouse pad 900. If mouse 109 is not located within the multi-touch region associated with digital mouse pad 109, then method 1000 terminates. However, if mouse 109 is located in the multi-touch region then method 1000 proceeds to step 1040.

At step 1040, CPU 102 displays UI elements 910 on digital mouse pad 900. In one embodiment, UI elements 910 may include digital buttons 911, 912, and 913 for performing clipboard functions as well as thumbnails 914, 915, etc. for displaying objects stored in a clipboard. UI elements 910 may be displayed in proximity to the location of mouse 109 on secondary multi-touch display device 111. In alternative embodiments, UI elements 910 may be displayed around the perimeter of the multi-touch region associated with digital mouse pad 900.

At step 1050, CPU 102 detects a multi-touch gesture on digital mouse pad 900. In one embodiment, CPU 102 is configured to detect point input at a position on secondary multi-touch display device 111 that corresponds to one of the UI elements in digital mouse pad 900. For example, CPU 102 may be configured to detect when a user touches digital button 911. At step 1060, CPU 102 performs an operation based on the multi-touch gesture detected in step 1040. Returning to the example involving digital button 911, digital mouse pad 900 may be configured to perform a copy operation for any object currently highlighted in primary display device 110. After step 1060, method 1000 returns to step 1020, where CPU 102 detects a new location of mouse 109 on secondary multi-touch display device 111.

In sum, the techniques disclosed above integrate multi-touch display surfaces with a conventional desktop environment. A multi-touch desktop environment includes a primary display device and a secondary multi-touch display device located horizontally on the desktop surface between the primary display device and an end-user. A keyboard and mouse are located in proximity to the secondary multi-touch display device. The multi-touch desktop environment defines regions of the secondary multi-touch display device in proximity to the keyboard and mouse for displaying various tools for managing applications running on primary display device. These tools include an enhanced task bar, a multi-functional touch pad, and a digital mouse pad. In addition, secondary multi-touch display device may implement a continuous workspace that effectively increases the display area of the primary multi-touch display device.

One advantage of the disclosed technique is that multi-touch surfaces are integrated with the desktop environment without removing the traditional keyboard and mouse used for precision input. A user may still type using a keyboard or use a mouse for precision selection. In addition, the user may utilize multi-touch regions in proximity to the keyboard and mouse to perform operations better suited to multi-touch input. In this manner, the bandwidth of interaction between the user and the computer interface is increased.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for configuring a multi-touch surface to display a digital mouse pad, the method comprising:
    defining a region on the multi-touch surface for displaying the digital mouse pad, wherein the region is proximate to a physical mouse device detected on the multi-touch surface and configured to transmit user input signals to a processing unit;
    generating one or more user interface elements that are disposed within the digital mouse pad, wherein each user interface element is configured to control a different operation within an application window displayed via a display device;
    generating an additional user interface element disposed within the digital mouse pad comprising one or more thumbnail image views of one or more objects disposed in a clipboard;
    displaying the digital mouse pad in the region on the multi-touch surface;
    detecting multi-touch input associated with a first user interface element disposed within the digital mouse pad; and
    performing a first operation within the application window based on the multi-touch input.

2. The method of claim 1, further comprising:
    monitoring the multi-touch surface for any changes in a location of the mouse device; and
    in response to a change in the location of the mouse device, changing a location of the region to substantially match the change in the location of the mouse device.

3. The method of claim 1, wherein the first user interface element comprises a digital button, and, based on the multi-touch input, the one or more objects are highlighted with the mouse device and copied to the clipboard.

4. The method of claim 3, further comprising:
    detecting second multi-touch input associated with the additional user interface element; and
    performing a second operation within the application window based on the second multi-touch input.

5. The method of claim 1, wherein the first user interface element comprises a digital button, and, based on the multi-touch input, the one or more objects are highlighted with the mouse device and cut and pasted to the clipboard.

6. The method of claim 1, wherein the first user interface element comprises a digital button, and, based on the multi-touch input, the one or more objects disposed within the clipboard are pasted within the application window.

7. A non-transitory computer-readable storage medium containing a program which, when executed, performs an operation for configuring a multi-touch surface to display a digital mouse pad, the operation comprising:
    defining a region on the multi-touch surface for displaying the digital mouse pad, wherein the region is proximate to a physical mouse device detected on the multi-touch surface and configured to transmit user input signals to a processing unit;
    generating one or more user interface elements that are disposed within the digital mouse pad, wherein each user interface element is configured to control a different operation within an application window displayed via a display device;
    generating an additional user interface element disposed within the digital mouse pad comprising one or more thumbnail image views of one or more objects disposed in a clipboard;
    displaying the digital mouse pad in the region on the multi-touch surface;
    detecting multi-touch input associated with a first user interface element disposed within the digital mouse pad; and
    performing a first operation within the application window based on the multi-touch input.

8. The non-transitory computer-readable storage medium of claim 7, the operation further comprising:
    monitoring the multi-touch surface for any changes in a location of the mouse device; and in response to a change in the location of the mouse device, changing a location of the region to substantially match the change in the location of the mouse device.

9. The non-transitory computer-readable storage medium of claim 7, wherein the first user interface element comprises a digital button, and, based on the multi-touch input, the one or more objects are highlighted with the mouse device and copied to the clipboard.

10. The non-transitory computer-readable storage medium of claim 9, the operation further comprising:
detecting second multi-touch input associated with the additional user interface element; and
performing a second operation within the application window based on the second multi-touch input.

11. The non-transitory computer-readable storage medium of claim 7, wherein the first user interface element comprises a digital button, and, based on the multi-touch input, the one or more objects are highlighted with the mouse device and cut and pasted to the clipboard.

12. The non-transitory computer-readable storage medium of claim 7, wherein the first user interface element comprises a digital button, and, based on the multi-touch input, the one or more objects disposed within the clipboard are pasted within the application window.

13. The non-transitory computer-readable storage medium of claim 7, wherein the one or more thumbnail image views include a plurality of thumbnail image views, and each thumbnail image view included in the plurality of thumbnail image views corresponds to a different object disposed in the clipboard.

14. The non-transitory computer-readable storage medium of claim 7, the operation further comprising:
receiving input selecting a thumbnail image view included in the one or more thumbnail image views; and
in response, pasting an object associated with the thumbnail image view within the application window.

15. A system configured to display a digital mouse pad on a multi-touch surface, the system comprising:
a multi-touch surface; and
a processing unit coupled to the multi-touch surface and configured to:
define a region on the multi-touch surface for displaying the digital mouse pad, wherein the region is proximate to a physical mouse device detected on the multi-touch surface and configured to transmit user input signals to the processing unit,
generate one or more user interface elements that are disposed within the digital mouse pad, wherein each user interface element is configured to control a different operation within an application window displayed via a display device,
generate an additional user interface element disposed within the digital mouse pad comprising one or more thumbnail image views of one or more objects disposed in a clipboard,
display the digital mouse pad in the region on the multi-touch surface,
detect multi-touch input associated with a first user interface element disposed within the digital mouse pad, and
perform a first operation within the application window based on the multi-touch input.

16. The system of claim 15, the processing unit further configured to:
monitor the multi-touch surface for any changes in a location of the mouse device; and
in response to a change in the location of the mouse device, change a location of the region to substantially match the change in the location of the mouse device.

17. The system of claim 15, wherein the first user interface element comprises a digital button, and, based on the multi-touch input, the one or more objects are highlighted with the mouse device and copied to the clipboard.

18. The system of claim 17, the processing unit further configured to:
detect second multi-touch input associated with the additional user interface element; and
perform a second operation within the application window based on the second multi-touch input.

19. The system of claim 15, wherein the first user interface element comprises a digital button, and, based on the multi-touch input, the one or more objects are highlighted with the mouse device and cut and pasted to the clipboard.

20. The system of claim 15, wherein the first user interface element comprises a digital button, and, based on the multi-touch input, the one or more objects disposed within the clipboard are pasted within the application window.

* * * * *